(12) United States Patent
Smedresman et al.

(10) Patent No.: US 10,215,335 B2
(45) Date of Patent: *Feb. 26, 2019

(54) SELF-RETAINING OIL NOZZLE

(71) Applicant: United Technologies Corporation, Farmington, CT (US)

(72) Inventors: Adam G. Smedresman, Larchmont, NY (US); Yuk-Kwan Brian Yuen, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,185

(22) Filed: Feb. 28, 2018

(65) Prior Publication Data

US 2018/0187831 A1 Jul. 5, 2018

Related U.S. Application Data

(63) Continuation of application No. 15/252,934, filed on Aug. 31, 2016, now Pat. No. 9,939,107.

(51) Int. Cl.
*F16N 21/04* (2006.01)
*B05B 15/65* (2018.01)
*F01D 25/18* (2006.01)
*B05B 1/00* (2006.01)
*F01D 25/16* (2006.01)
(Continued)

(52) U.S. Cl.
CPC ............... *F16N 21/04* (2013.01); *B05B 1/00* (2013.01); *B05B 15/65* (2018.02); *F01D 25/16* (2013.01); *F01D 25/18* (2013.01); *F01M 1/08* (2013.01); *F05D 2220/32* (2013.01); *F05D 2260/98* (2013.01); *F16N 2021/005* (2013.01); *F16N 2210/02* (2013.01)

(58) Field of Classification Search
CPC ... B05B 15/065; F16N 21/04; F16N 2210/02; F01D 25/18; F05D 2220/32
See application file for complete search history.

(56) References Cited

U.S. PATENT DOCUMENTS 1,748,817 A 2/1930 Zerk
1,799,433 A 4/1931 Murphy
(Continued)

FOREIGN PATENT DOCUMENTS

CN 102143866 A 8/2011

OTHER PUBLICATIONS

Extended European Search Report for EP Application No. 17188412.5, dated Jan. 19, 2018, 7 Pages.

*Primary Examiner* — Christopher Kim
(74) *Attorney, Agent, or Firm* — Kinney & Lange, P.A.

(57) ABSTRACT

An oil nozzle assembly includes a nozzle body and a nozzle insert. The nozzle body includes a main portion, a tip portion, and a lip. The tip portion is connected to the main portion. The lip extends outwards from the tip portion and has an outer width. The nozzle insert includes a sleeve, an endwall connected to the sleeve, an orifice, and a retention element. The orifice is disposed in the endwall and is fluidly connected to the tip portion of the nozzle body. The retention element extends inward from the sleeve. A portion of the retention element has an inner width that is less than the outer width of the lip. The nozzle insert is disposed onto the tip portion of the nozzle body.

7 Claims, 11 Drawing Sheets

(51) Int. Cl.
*F01M 1/08* (2006.01)
*F16N 21/00* (2006.01)

(56) References Cited

U.S. PATENT DOCUMENTS

| | | |
|---|---|---|
| 3,843,030 A | 10/1974 | Micallef |
| 4,669,664 A | 6/1987 | Garneau |
| 4,779,803 A | 10/1988 | Corsette |
| 4,809,816 A | 3/1989 | Kinack et al. |
| 4,863,354 A | 9/1989 | Asselin et al. |
| 6,554,212 B2 | 4/2003 | Borcea et al. |
| 7,314,188 B2 | 1/2008 | Watson et al. |
| 7,540,434 B2 * | 6/2009 | Gohring ............... B05B 7/0815 239/290 |
| 9,939,107 B2 * | 4/2018 | Smedresman .......... B05B 15/65 |
| 2017/0350275 A1 | 12/2017 | Von Berg et al. |

* cited by examiner

SELF-RETAINING OIL NOZZLE

CROSS-REFERENCE TO RELATED APPLICATION(S)

This application is a continuation of U.S. application Ser. No. 15/252,934 filed Aug. 31, 2016 entitled "SELF-RETAINING OIL NOZZLE" by A. Smedresman and Y. Yuen, which is assigned to the same assignee as the present application. Application Ser. No. 15/252,934 is hereby incorporated by reference.

BACKGROUND

The present disclosure relates generally to nozzles, and more particularly to oil nozzles for use in gas turbine engines.

Within gas turbine engines, oil nozzles are used for distributing lubricating oil throughout bearing compartments. Oil nozzles incorporated into the bearing compartment, and other gas turbine engine housings, require flow testing before use. Disassembling compartments to perform flow testing can expose large and expensive parts to damage and debris within the compartments. If parts become damaged, entire housings and assemblies may require replacement.

Oil nozzles often include fasteners as large as or larger than the nozzles themselves for retaining the nozzles within the bearing compartment. Oil nozzles with large fasteners often cannot be removed from bearing compartments without disassembling major engine modules due to other engine components being in the path of extraction or space requirements for tooling to engage with the nozzle fasteners.

SUMMARY

An oil nozzle assembly includes a nozzle body and a nozzle insert. The nozzle body includes a main portion, a tip portion, a collar, and a lip. The tip portion is connected to the main portion. The collar is positioned at an interface between the main portion and the tip portion. The lip extends radially outward from the tip portion and has an outer diameter. The nozzle insert includes a sleeve, an endwall connected to the sleeve, an orifice, and a retention element. The orifice is disposed in the endwall and is fluidly connected to the tip portion of the nozzle body. The retention element extends radially inward from the sleeve. A portion of the retention element has an inner diameter that is less than the outer diameter of the lip.

An oil nozzle assembly includes a nozzle body and a nozzle insert. The nozzle body includes a main portion, a tip portion, and a lip. The tip portion is connected to the main portion. The lip extends outwards from the tip portion and has an outer width. The nozzle insert includes a sleeve, an endwall connected to the sleeve, an orifice, and a retention element. The orifice is disposed in the endwall and is fluidly connected to the tip portion of the nozzle body. The retention element extends inward from the sleeve. A portion of the retention element has an inner width that is less than the outer width of the lip. The nozzle insert is disposed onto the tip portion of the nozzle body.

DETAILED DESCRIPTION

Figure 1A:
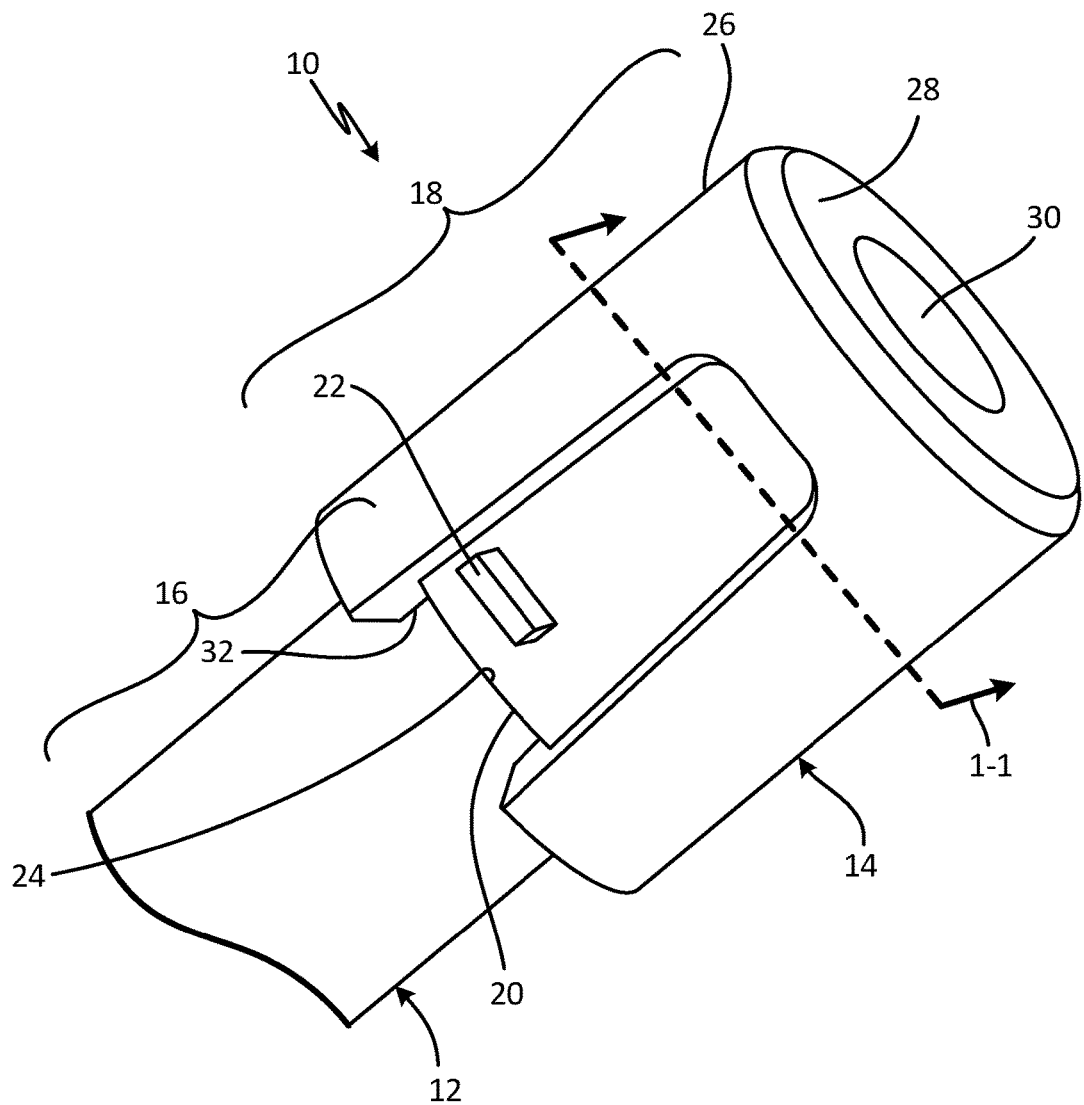
FIG. 1A is an isometric view of an oil nozzle assembly with a nozzle insert and a nozzle body.
Figure 1B:
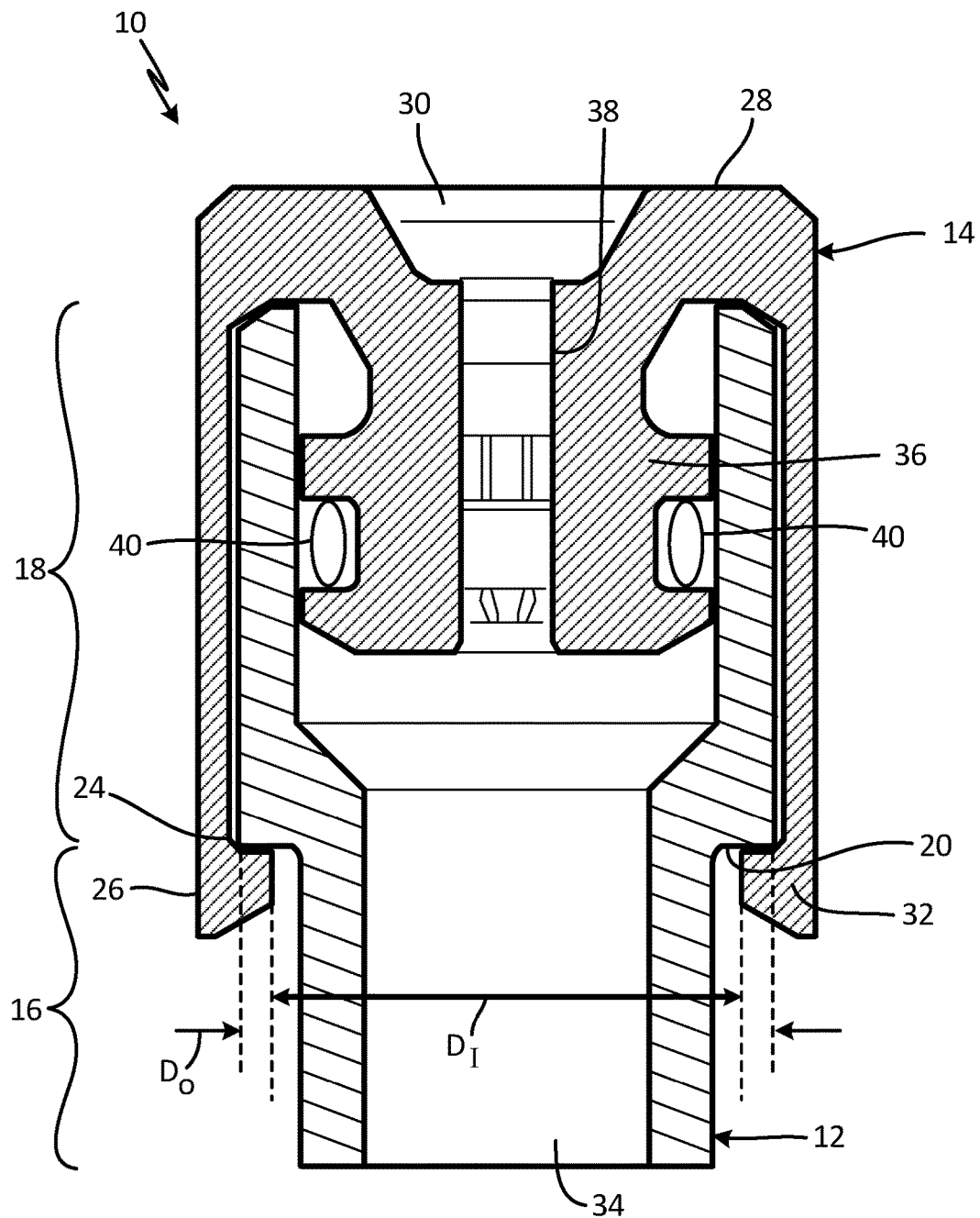
FIG. 1B is a cross-sectional view of the nozzle insert and nozzle body taken along line 1-1 from FIG. 1A.
Figure 1C:
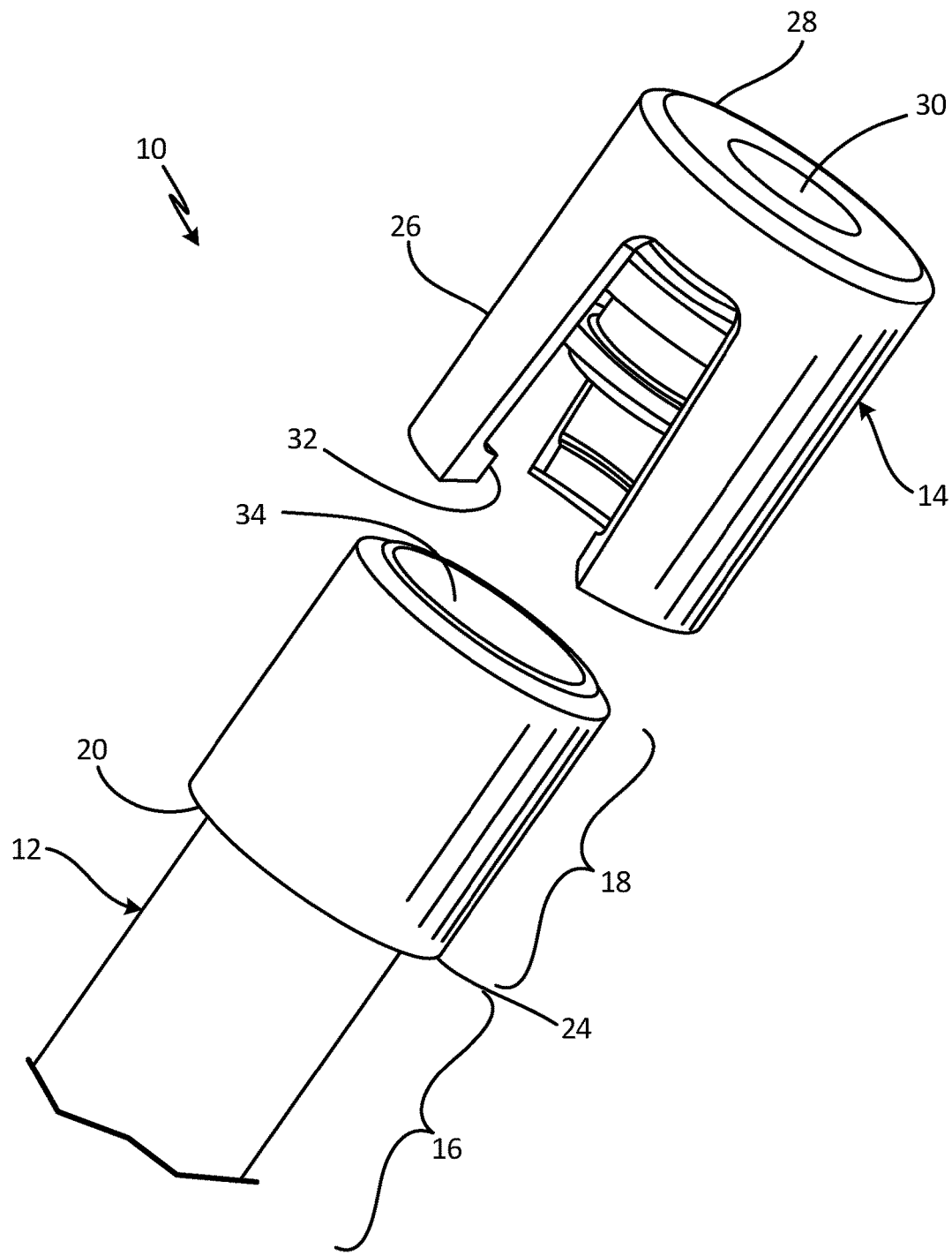
FIG. 1C is an exploded isometric view of the nozzle body and the nozzle insert of FIG. 1A, with the nozzle insert shown in a cross-section view.
Figure 1D:
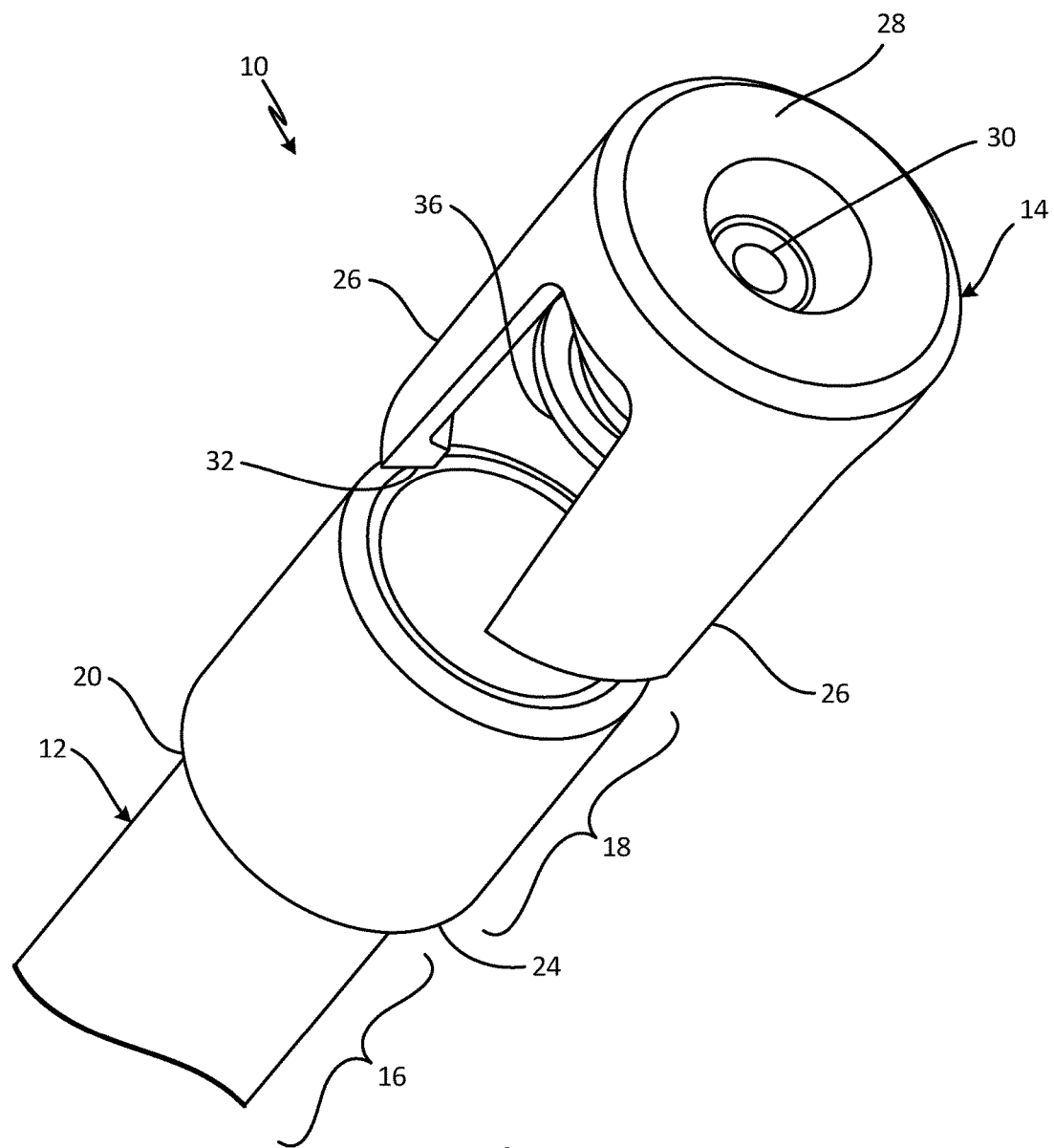
FIG. 1D is another exploded isometric view of the nozzle body and the nozzle insert of FIG. 1A.
Figure 1E:
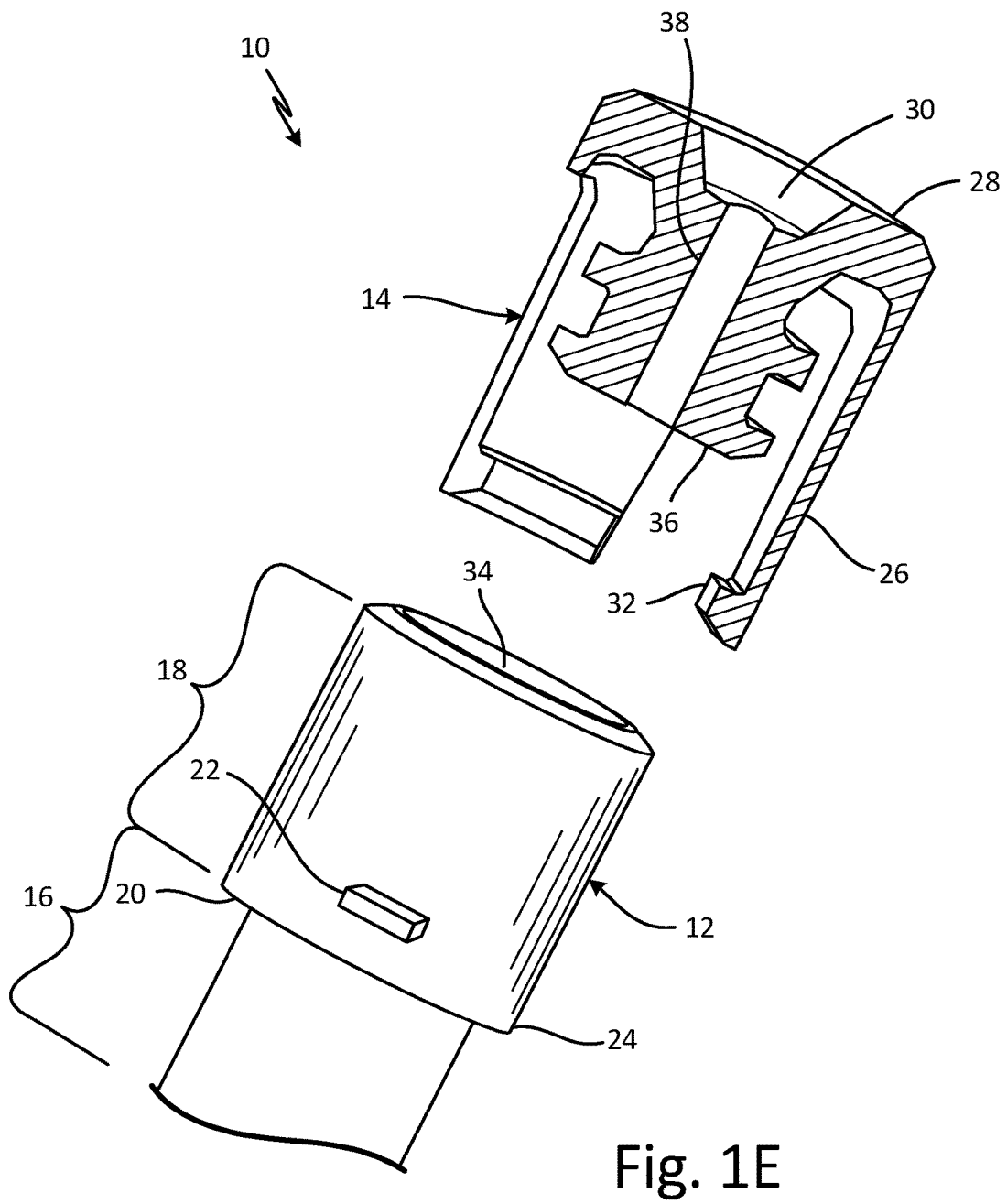
FIG. 1E is an exploded isometric view of the nozzle body and the nozzle insert of FIG. 1A, with the nozzle insert shown in a cross-section view.

FIGS. 1A-1E show different aspects of oil nozzle assembly 10 with nozzle body 12 and nozzle insert 14, and are discussed as a group below. FIGS. 1A and 1B show nozzle insert 14 disposed onto nozzle body 12 and FIGS. 1C, 1D, and 1E are exploded views of nozzle body 12 and nozzle insert 14. FIG. 1B is a cross-sectional view of nozzle body 12 and nozzle insert 14 taken along line 1-1 from FIG. 1A.

FIG. 1A is an isometric view of oil nozzle assembly 10 with nozzle body 12 and nozzle insert 14. Nozzle body 12 includes main portion 16, tip portion 18, collar 20, and anti-rotation feature 22. Tip portion 18 of nozzle body 12 is connected to main portion 16 and is located on a distal end of nozzle body 12. Main portion 16 and tip portion 18 can be made of one continuous piece of material or can be separately attached to one another. Tip portion 18 of nozzle body 12 has outer diameter $D_O$.

Collar 20 is positioned at an interface between main portion 16 and tip portion 18. Collar 20 can also include lip 24 which extends radially outward from tip portion 18. In FIG. 1A, lip 24 extends the entire length of tip portion 18 of nozzle body 12. Nozzle body 12 includes a passage (not shown in FIG. 1A) that extends through and fluidly connects main portion 16 and tip portion 18. Anti-rotation feature 22 includes a tab of solid material extending outward from nozzle body 12. Anti-rotation feature 22 juts out from nozzle body 12 so as to engage with nozzle insert 14 and prevent nozzle insert 14 from rotating about nozzle body 12. In other non-limiting embodiments, anti-rotation feature 22 can be located on main portion 16 of nozzle body 12.

In one non-limiting embodiment, main portion 16 and tip portion 18 are formed from a single piece of material and are integrally formed. In other non-limiting embodiments, main portion 16 and tip portion 18 can be separate elements connected together through chemical or mechanical attachment. Nozzle body 12 can include a metallic material such as nickel, titanium, steel or aluminum, as well as non-metallic materials. Additionally, nozzle body 12 is shown in FIG. 1A to include a cylindrical shape with a circular cross-section, but in other non-limiting embodiments can also include other geometric shapes such as a rectangle or oval.

Nozzle insert 14 includes sleeve 26, endwall 28, orifice 30, and retention element 32. Nozzle insert 14 can include a metallic material such as nickel, titanium, steel or aluminum, as well as non-metallic materials. In one non-limiting embodiment, nozzle insert 14 can be formed through layer-by-layer additive manufacturing. Nozzle insert 14 can also be formed through subtractive manufacturing, or by attaching separate pieces of material together to form nozzle insert 14. Sleeve 26 includes a tubular piece of solid material extending in a circumferential direction around nozzle insert 14. In one non-limiting embodiment, sleeve 26 includes an interrupted surface that includes a plurality or cutouts or openings in sleeve 26 which add flexibility to sleeve 26 enabling retention elements 32 to flex outwardly and engage with lip 24. Endwall 28 includes a flat circular disk of solid material. Endwall 28 is connected to sleeve 26 and is positioned at an end of sleeve 26. Orifice 30 includes a hole or bore disposed in endwall 28. In other non-limiting embodiments, orifice 30 can include a non-circular shape as well as being configured in a position not normal to endwall 28.

Retention element 32 includes a tab of solid material. Retention element 32 is connected to sleeve 26 and extends radially inward from sleeve 26. In one non-limiting embodiment, sleeve 26, endwall 28, and retention element 32 are connected as and can be formed out of a single piece of material, such as through additive or subtractive methods of manufacturing. In other non-limiting embodiments, sleeve 26, endwall 28, and retention element 32 can be separate elements connected together through chemical or mechanical attachment. A portion of retention element 32 has inner diameter $D_I$ that is less than outer diameter $D_O$ of tip portion 18 in an un-altered state such as for example when retention element 32 is not pulled away from nozzle body 12. As can be seen in FIG. 1C, retention element 32 circumferentially extends along a portion of nozzle insert 14.

As can be seen in FIG. 1B, nozzle body 12 includes first bore 34 and nozzle insert 14 includes plug 36, second bore 38, and O-ring 40. First bore 34 includes a channel extending through nozzle body 12 providing for the passage of a fluid through nozzle body 12. Plug 36 includes a solid piece of material that extends down into and through a center of nozzle insert 14. Second bore 38 includes a channel running through plug 36 of nozzle insert 14 providing for the passage of a fluid through nozzle insert 14. Together, first bore 34 and second bore 38 form a channel extending through main portion 16 of nozzle body 12 and tip portion 18 of nozzle insert 14. Second bore 38 opens up into orifice 30 in endwall 28 and fluidly connects to the channel formed by first bore 34 and second bore 38. O-ring 40 includes a ring of solid material extending circumferentially around plug 36 of nozzle insert 14. O-ring 40 creates a seal between plug 36 of nozzle insert 14 and nozzle body 12 preventing the passage of fluid past O-ring 40. In other non-limiting embodiments, oil nozzle assembly 10 can include zero or more than one O-ring 40 along an interface between nozzle body 12 and nozzle insert 14.

As shown in FIGS. 1A-1B, nozzle insert 14 is disposed onto and covers tip portion 18 of nozzle body 12. During operation of oil nozzle assembly 10, oil is drawn through nozzle body 12 from an oil bearing housing that nozzle body 12 is attached to, into orifice 30 of nozzle insert 14, through nozzle insert 14, and directed out of nozzle insert 14. The oil directed out of nozzle insert 14 enters into an oil bearing compartment to lubricate a bearing or set of bearings, for example in a gas turbine engine or other machines which include bearing compartments.

Retention element 32 is in contact with collar 20 and lip 24 of nozzle body 12. In FIGS. 1A-1B, retention element 32 is positioned further away than lip 24 of nozzle body 12 from an end of tip portion 18 of nozzle body 12 that is opposite of main portion 16. The contact between retention element 32 and lip 24 prevents axial displacement of retention element 32 and nozzle insert 14 in a direction towards a distal end of tip portion 18 of nozzle body 12 due to the radial overlap of retention element 32 and collar 20 of nozzle body 12. Retention element 32 of nozzle insert 14 engages with lip 24 of nozzle body 12 such that lip 24 stops retention element 32 from displacement in a direction towards an end of tip portion 18 of nozzle body 12 that is opposite from main portion 16.

The oil nozzle assembly 10 includes a snap-on design allowing for installation and removal of nozzle insert 14 without the need of separate fasteners for attaching nozzle insert 14 to nozzle body 12. Removing the need for separate fasteners eliminates the requirement for extra space to remove nozzle insert 14 from an oil bearing compartment. During testing phases of oil nozzle assembly 10, ease of installation and removal is greatly increased allowing for faster change-overs during oil nozzle testing. Replacement of damaged nozzles is also made easier by enabling just nozzle insert 14 to be replaced as opposed to needing to remove the entire nozzle body 12 from the bearing compartment, such as is needed with nozzles including removable fasteners or nozzles that include a nozzle insert and nozzle body built as a single piece.

For removal of nozzle insert 14 from nozzle body 12, a small tool can interact with retention element 32 to pull or draw retention element 32 radially outwards from nozzle body 12. When retention element 32 is drawn away from nozzle body 12 such that inner diameter $D_I$ of retention element 32 is larger than outer diameter $D_O$ of tip portion 18, retention element 32 disengages from lip 24 of nozzle body 12 and nozzle insert 14 can be pulled off of nozzle body 12. Oil nozzle assembly 10 does not include a removable fastener which eliminates the need for large clearances surrounding nozzle insert 14 for adequate space for access to removable fasteners. Without the need for extra space to remove fasteners, oil nozzle assembly 10 allows for tighter tolerances and spacing between components within an oil bearing assembly that houses oil nozzle assembly 10.

Figure 2A:
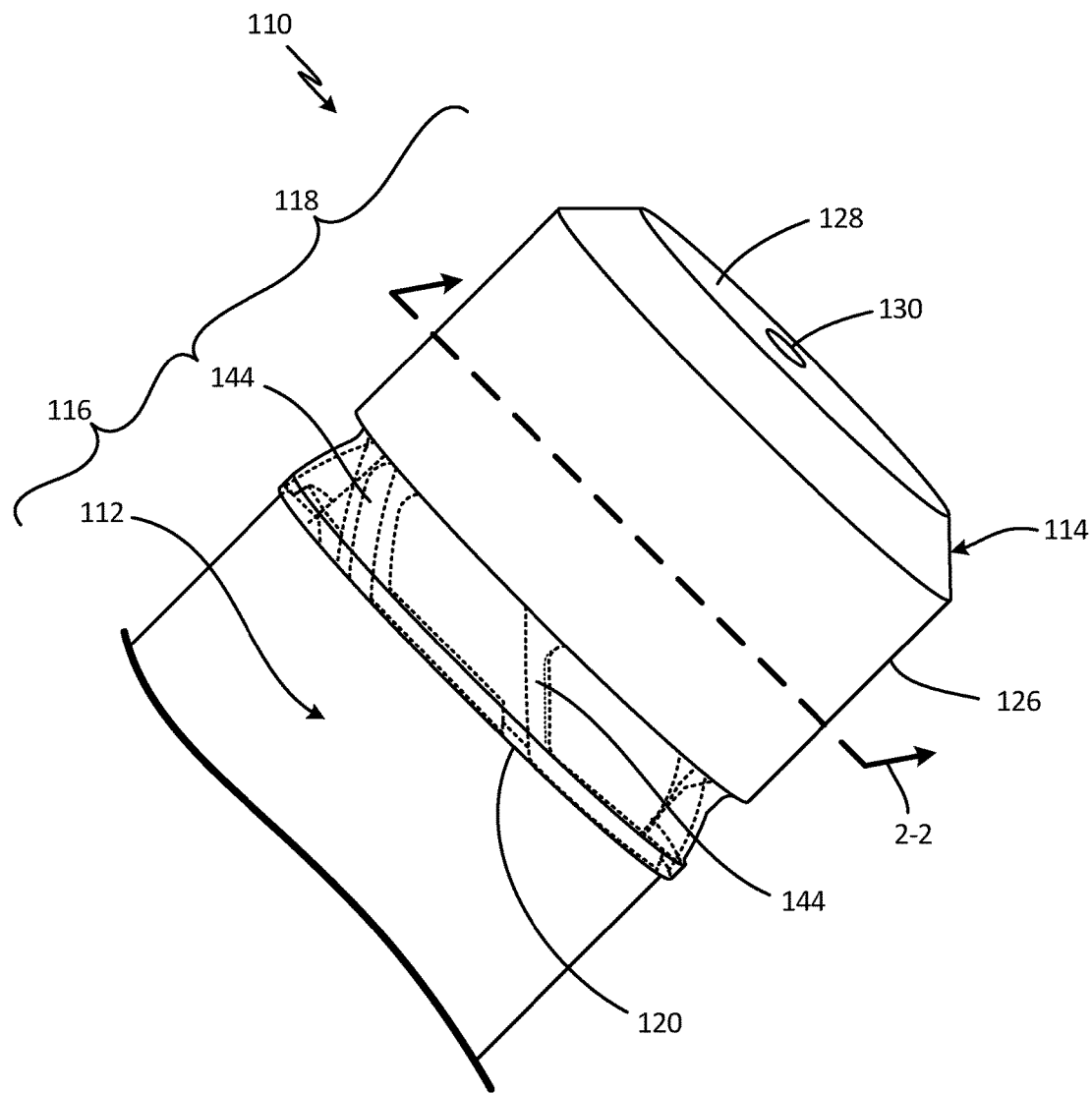
FIG. 2A is an isometric view of another oil nozzle assembly with a nozzle insert and a nozzle body.
Figure 2B:
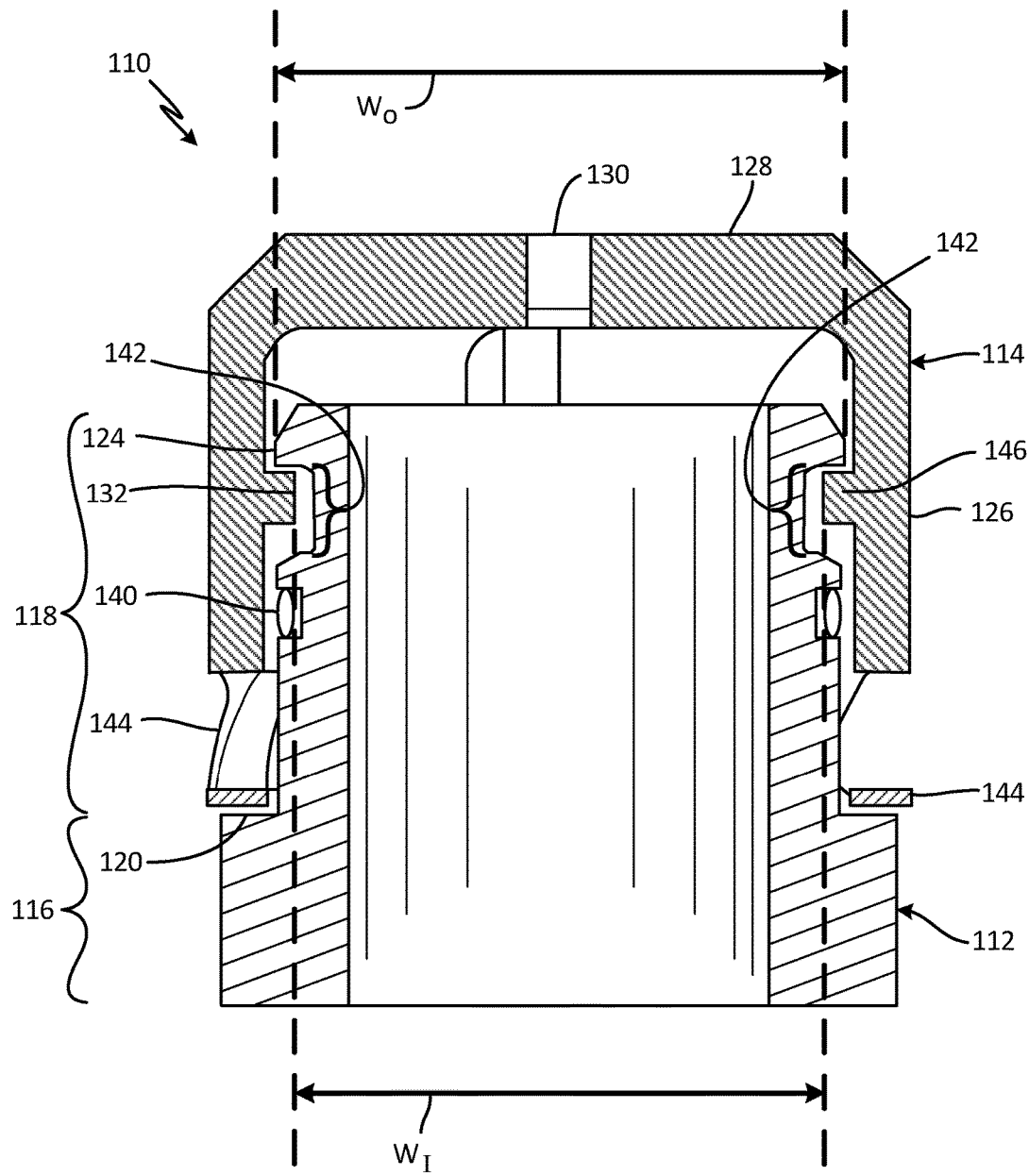
FIG. 2B is a cross-sectional side view of the nozzle insert and nozzle body taken along line 2-2 from FIG. 2A.
Figure 2C:
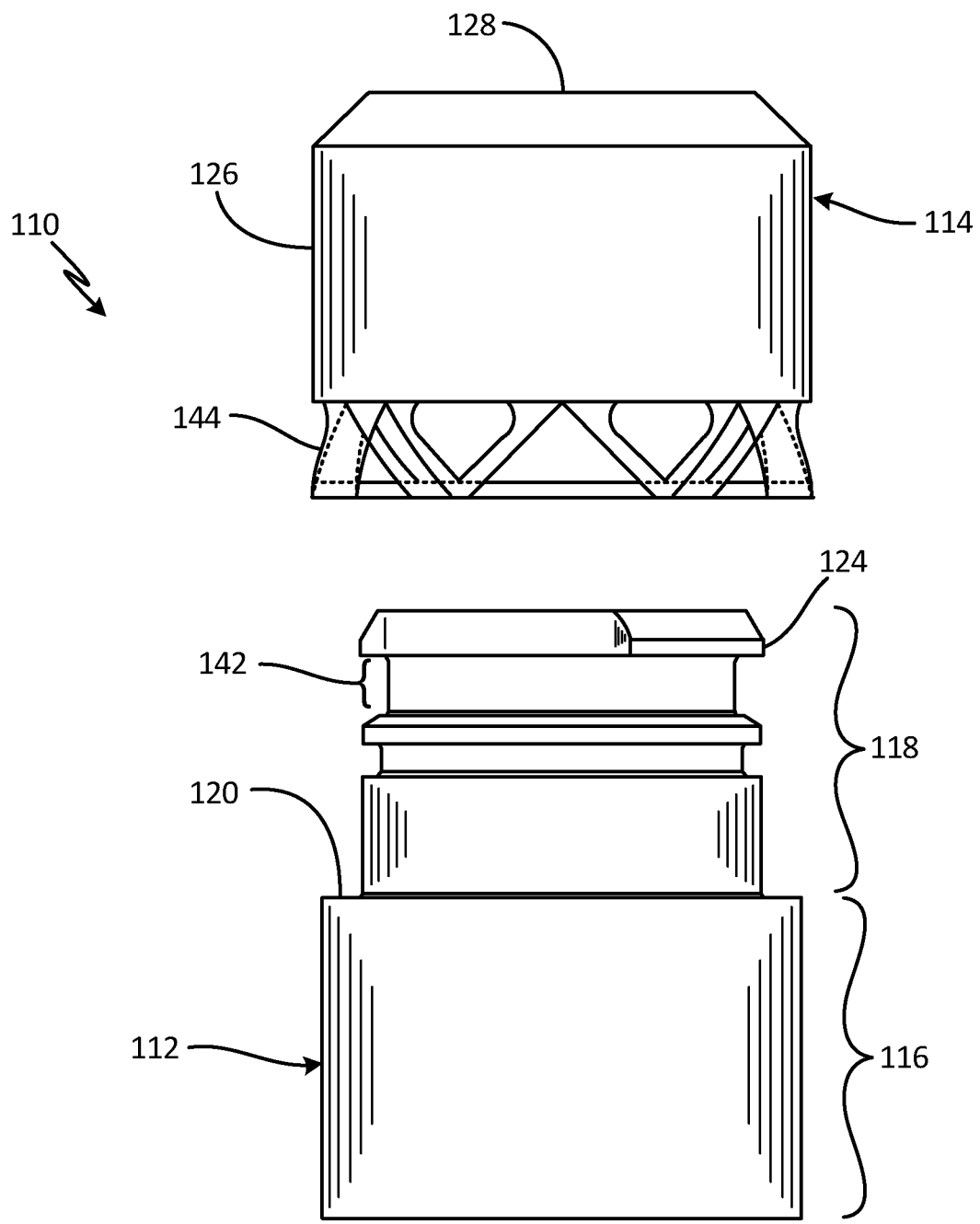
FIG. 2C is an exploded side view of the nozzle body and the nozzle insert of FIG. 2A.
Figure 2D:
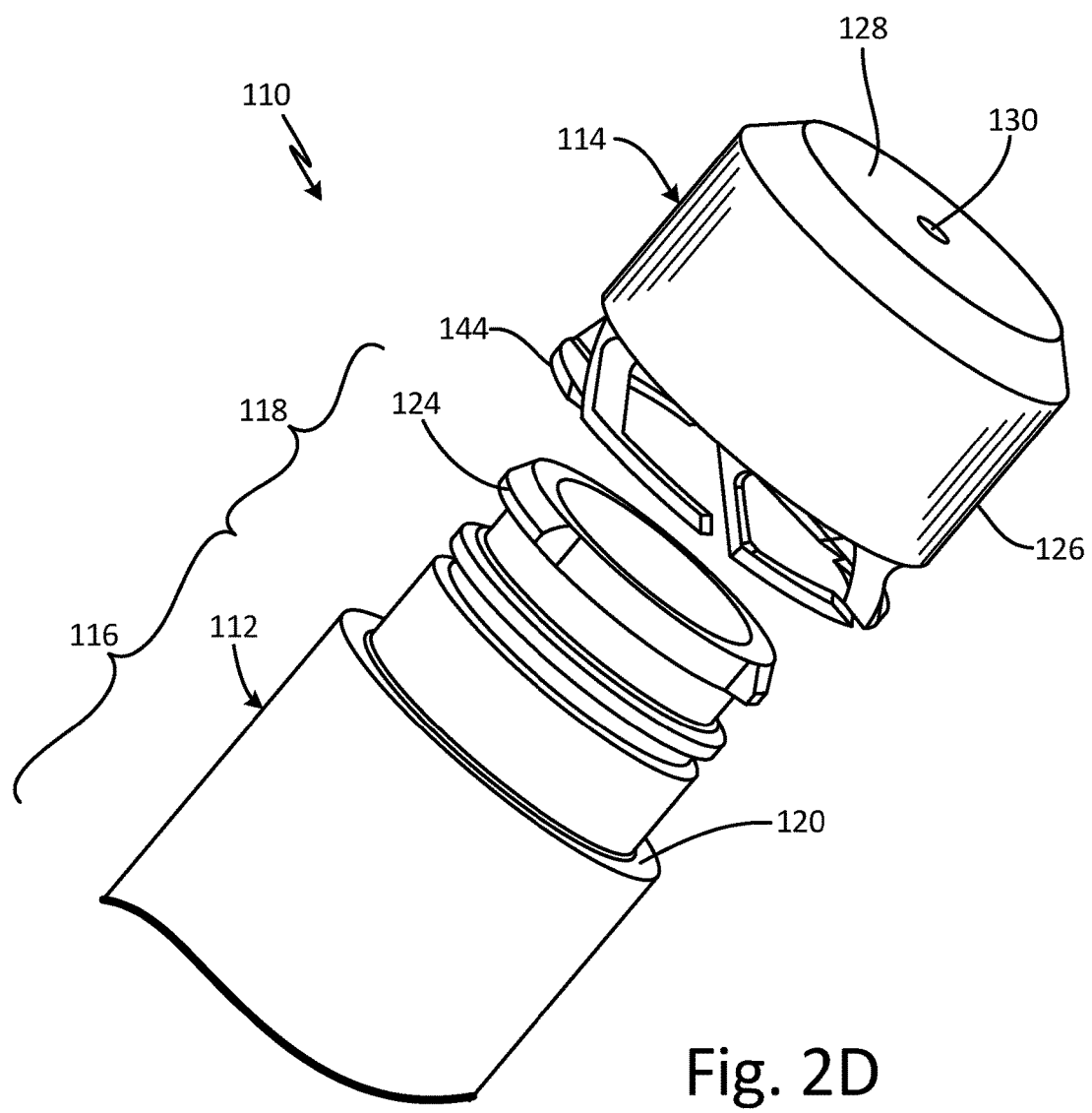
FIG. 2D is an exploded isometric view of the nozzle body and the nozzle insert of FIG. 2A.
Figure 2E:
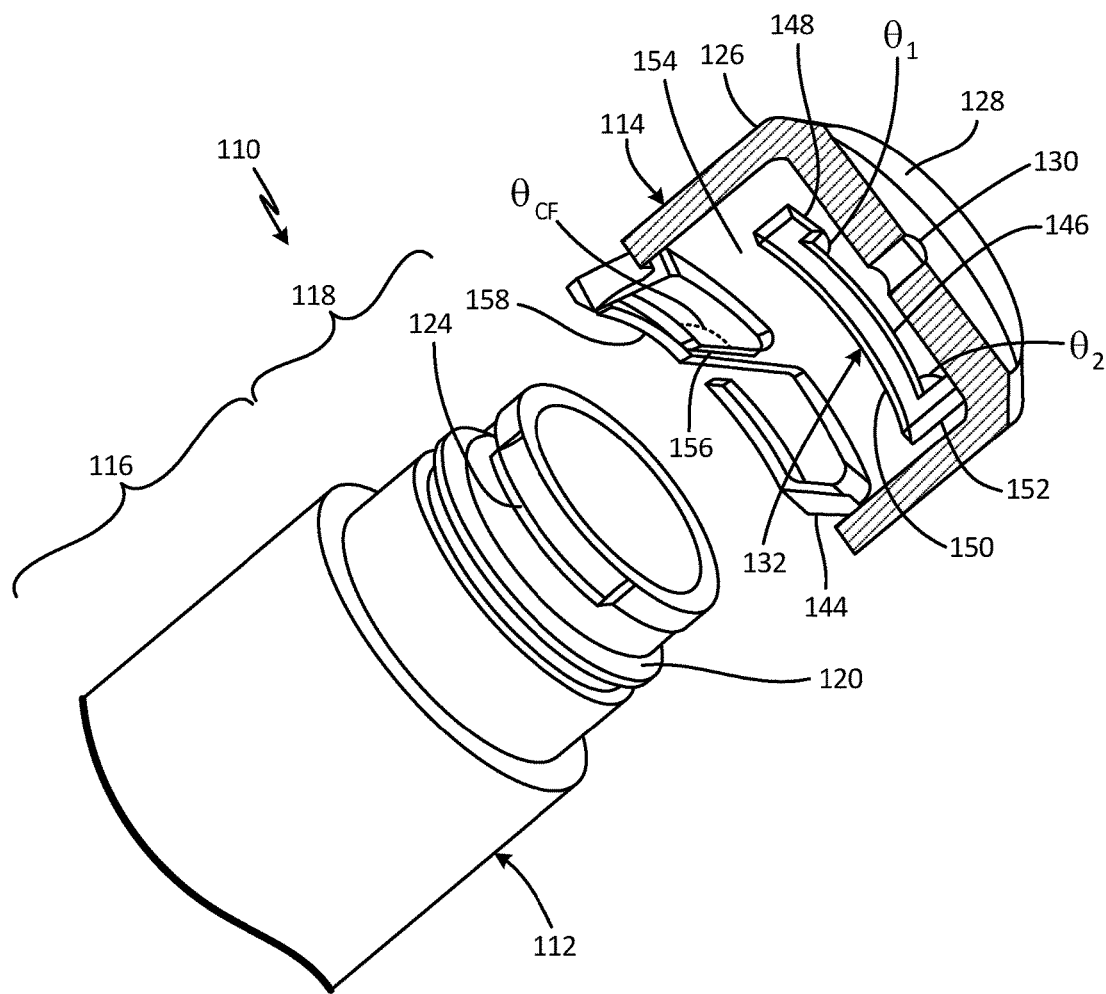
FIG. 2E is another exploded isometric view of the nozzle body and the nozzle insert of FIG. 2A, with the nozzle insert shown in a cross-section view.

FIGS. 2A-2E show different aspects of oil nozzle assembly 110 with nozzle body 112 and nozzle insert 114, and are discussed as a group below. FIGS. 2A-2B show nozzle insert 114 disposed onto nozzle body 112 and FIGS. 2C-2E are exploded views of nozzle body 112 and nozzle insert 114. FIG. 2B is a cross-sectional view of nozzle body 112 and nozzle insert 114 taken along line 2-2 from FIG. 2A.

FIG. 2A is an isometric view of oil nozzle assembly 110 with nozzle body 112 and nozzle insert 114. Nozzle body 112 includes main portion 116, tip portion 118, collar 120, and lip 124. Tip portion 118 of nozzle body 112 is connected to main portion 116 and is located on a distal end of nozzle body 112. Main portion 116 and tip portion 118 can be made of one continuous piece of material. Collar 120 is positioned at an interface between main portion 116 and tip portion 118. Tip portion 118 includes lip 124. Lip 124 includes a solid piece of material which extends radially outward from tip portion 118. Lip 124 is located on a distal end of tip portion 118 from nozzle main portion 116 of nozzle body 112. Lip 124 forms channel 142 in tip portion 118 of nozzle body 112. Lip 124 has outer width $W_O$. Nozzle body 112 also includes O-ring 140 positioned between tip portion 118 of nozzle body and nozzle insert 114.

Nozzle insert 114 includes sleeve 126, endwall 128, orifice 130, retention element 132, and compliant features 144. Sleeve 126 includes a tubular piece of solid material extending in a circumferential direction around nozzle insert 114. Endwall 128 includes a flat circular disk of solid material. Endwall 128 is connected to sleeve 126 and is positioned at an end of sleeve 126. Orifice 130 includes a hole or bore disposed in endwall 128. Retention element 132 includes a tab of solid material. Retention element 132 is connected to sleeve 126 and extends radially inward from sleeve 126. Retention element 132 has inner width $W_I$. As shown in FIG. 2E, retention element 132 can include tab 146. Tab 146 of nozzle insert 114 includes first segment 148, second segment 150, and third segment 152. First segment 148, second segment 150, and third segment 152 include solid pieces of material extending radially inwards from inner sidewall 154 of sleeve 126.

First segment 148 is connected to inner sidewall 154 of sleeve 126. Second segment 150 is connected to first segment 148. Second segment 150 is longer than first segment 148. First angle $\theta_1$ is formed between first segment 148 and second segment 150. In one non-limiting embodiment, first angle $\theta_1$ can include an angle of 90°. Third segment 152 is connected to second segment 150. Third segment 152 is shorter than second segment 150. Second angle $\theta_2$ is formed between second segment 150 and third segment 152. In one non-limiting embodiment, second angle $\theta_2$ can include an angle of 90°. In other non-limiting embodiments, first and second angles $\theta_1$ and $\theta_2$ can include angles less than or greater than 90°.

Compliant features 144 include strips of solid material extending in an axial direction from sleeve 126 in a direction opposite from endwall 128. Each of compliant features 144 includes first portion 156 and second portion 158. First portion 156 and second portion 158 form angle $\theta_{CF}$. In one non-limiting embodiment, angle $\theta_{CF}$ between first portion 156 and second portion 158 can be greater than 90°. In other non-limiting embodiments, compliant features 144 can be curved throughout the entire length of each of compliant features 144. Compliant features 144 can also include a series of spring elements such as leaf springs.

In one non-limiting embodiment, sleeve 126, endwall 128, retention element 132, and compliant features 144 are connected as and can be formed out of a single piece of material, such as through additive or subtractive methods of manufacturing. In other non-limiting embodiments, sleeve 126, endwall 128, and retention element 132 can be separate elements connected together through chemical or mechanical attachment. Nozzle insert 114 with sleeve 126, endwall 128, and retention element 132 can include a metallic material such as nickel, titanium, steel or aluminum, as well as non-metallic materials.

Channel 142 of tip portion 118 on nozzle body 112 receives retention feature 132 of nozzle insert 114. As shown in FIG. 2B, second segment 150 of retention element 132 is positioned in channel 142. Inner width $W_I$ of retention feature 132 has a distance that is less than outer width $W_O$ of lip 124 such that lip 124 stops retention feature 132 from displacement in a direction towards an end of tip portion 114 opposite from main portion 116.

As shown in FIG. 2A-2B, compliant features 144 are compressed between collar 120 of nozzle body 112 and sleeve 126 of nozzle insert 114. Compliant features 144 exert a spring force onto collar 120 of nozzle body 112 biasing nozzle insert 114 in a direction towards an end of tip portion 118 of nozzle body 112.

Oil nozzle assembly 110 allows for installation and removal of nozzle insert 114 onto and from nozzle body 112 through a pressing and twisting process. During installation of nozzle insert 114 onto nozzle body 112, nozzle insert 114 is brought onto nozzle body 112 such that tip portion 118 of nozzle body 112 is inserted into sleeve 126 of nozzle insert 114. As tip portion 118 is fully inserted into nozzle insert 114, compliant features 144 are brought into contact with collar 120 of nozzle body 112. As compliant features 144 are brought into contact with collar 120, at least a portion of tab 146 of nozzle insert 114 becomes axially aligned with a portion of lip 124 of nozzle body 112. In FIGS. 2A-2E, circumferential alignment can be defined as elements occupying the same circumferential position along a circumferential direction. Additionally, axial alignment can be defined as elements occupying the same axial position along an axial direction. After compliant features 144 come into contact with collar 120, nozzle insert 114 is pushed further towards main portion 116 of nozzle body 112 to compress and bend compliant features 144 thereby allowing sleeve 126 to be drawn closer towards collar 120 than if compliant features 144 were not compressed. As sleeve 126 is drawn closer to collar 120, tab 146 of nozzle insert 114 is drawn axially towards collar 120 and out of axial alignment with lip 124 of nozzle body 112. When tab 146 and lip 124 are brought out of axial alignment, nozzle insert 114 can be twisted to slide tab 146 into circumferential alignment with lip 124.

In particular, when first segment 148 of tab 146 is brought out of axial alignment with lip 124, nozzle insert 114 can be twisted to slide first segment 148 circumferentially past lip 124. Once first segment 148 is slid past lip 124, compliant features 144 push nozzle sleeve 126 away from main portion 116 of nozzle body 112, and second segment 150 is brought into contact with lip 124. As second segment 150 is brought into contact with lip 124, first segment 148 and third segment 152 of tab 146 are brought into axial alignment with lip 124 and into a locked state.

In this locked state, tab 146 and lip 124 cannot be moved rotationally relative to each other unless nozzle insert 114 is pushed towards nozzle body 112. As nozzle insert 114 is pushed down into nozzle body 112, compliant features 144 compress and first and third segments 148 and 152 of tab 146 are drawn out of axial alignment with lip 124 thereby allowing nozzle insert 114 to rotate relative to nozzle body 112. Nozzle insert 114 can then be rotated relative to nozzle body 112 such that tab 146 is completely out of circumferential alignment with lip 124 thereby allowing nozzle insert 114 to be drawn away from and off of tip portion 116 of nozzle body 112.

The "locking" capability of oil nozzle assembly 110 allows nozzle insert 114 to stay attached onto nozzle body 112 during use of oil nozzle assembly 110 without coming loose or dislodged. Only upon a first translational and a second rotational application of force to nozzle insert 114 relative to nozzle body 112 can nozzle insert 114 be removed from nozzle body 112.

Oil nozzle assembly 110 does not include a removable fastener, which eliminates the need for large clearances surrounding nozzle insert 114 for adequate space for access to removable fasteners. Without the need for extra space to remove fasteners, oil nozzle assembly 110 allows for tighter tolerances and spacing between components within an oil bearing assembly that houses oil nozzle assembly 110.

Figure 3:
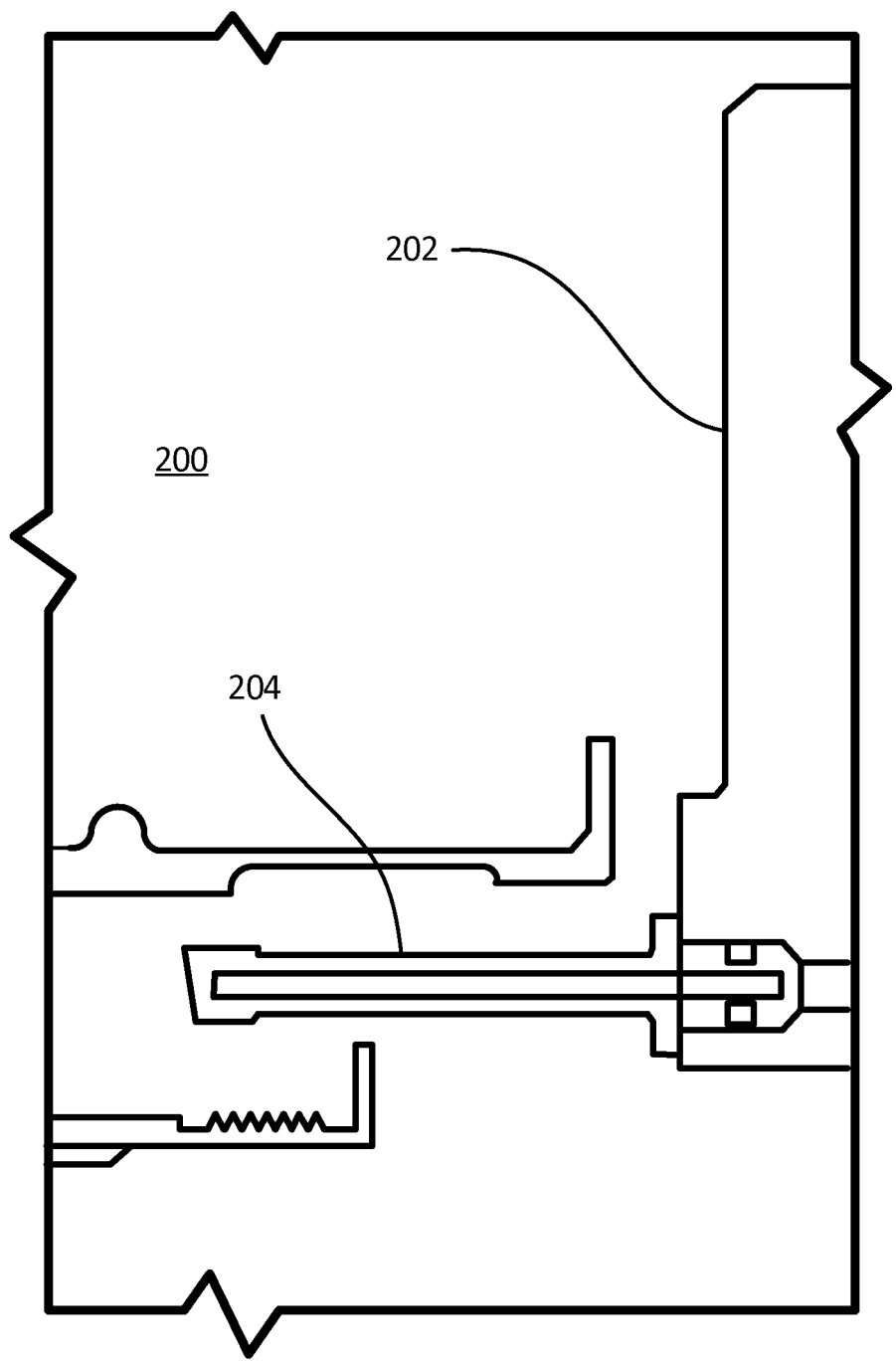
FIG. 3 is a cross-sectional view of an oil nozzle in a bearing compartment.

FIG. 3 is a cross-sectional view of bearing compartment 200 with bearing wall 202 and oil nozzle 204. Bearing compartment 200 includes a portion of an engine, for example a gas turbine engine, which houses bearings. Bearing wall 202 includes a wall within bearing compartment 200 for holding together a structure of bearing compartment 200. Oil nozzle 204 includes a nozzle for the distribution of a fluid within bearing compartment 200, for example lubricating oil. Oil nozzle can include oil nozzle assemblies 10 or 110 from FIGS. 1A-2E.

Oil nozzle 204 is mounted into bearing wall 202. Oil nozzle 204 distributes oil to bearing compartment 200. Oil nozzle 204 is fluidly connected to a source of oil. Bearing compartment 200 includes tight space with small clearances. Using oil nozzle 204, which can be oil nozzle assemblies 10 or 110, in bearing compartment 200 doesn't require the space needed to accommodate removable fasteners or space for tools to engage with removable tools, which reduces the time and energy for replacement and removal of oil nozzle 204 from bearing compartment 200.

Discussion of Possible Embodiments

The following are non-exclusive descriptions of possible embodiments of the present invention.

An oil nozzle assembly can include a nozzle body and/or a nozzle insert. The nozzle body can include a main portion, a tip portion, a collar, and/or a lip. The tip portion can be connected to the main portion. The collar can be positioned at an interface between the main portion and the tip portion. The lip can extend radially outward from the tip portion and can include an outer diameter. The nozzle insert can include a sleeve, an endwall connected to the sleeve, an orifice, and/or a retention element. The orifice can be disposed in the endwall and/or can be fluidly connected to the tip portion of the nozzle body. The retention element can extend radially inward from the sleeve. A portion of the retention element can include an inner diameter that can be less than the outer diameter of the lip.

The assembly of the preceding paragraph can optionally include, additionally and/or alternatively, any one or more of the following features, configurations and/or additional components.

The nozzle insert can be disposed onto the tip portion of the nozzle body such that the lip of the nozzle body prevents axial displacement of the retention element in a direction towards an end of the tip portion of the nozzle body opposite of the main portion.

The tip portion of the nozzle body can include a channel for receiving the retention element of the nozzle insert.

The nozzle insert can further comprise a plurality of compliant features that can extend from the sleeve in an axial direction from the sleeve in a direction opposite from the endwall.

The plurality of compliant features can be compressed between the collar of the nozzle body and the sleeve of the nozzle insert.

The plurality of compliant features exerts a spring force onto the collar of the nozzle body biasing the nozzle insert in a direction towards an end of the tip portion of the nozzle body.

An oil nozzle assembly can include a nozzle body and/or a nozzle insert. The nozzle body can include a main portion, a tip portion, and/or a lip. The tip portion can be connected to the main portion. The lip can extend outwards from the tip portion and can include an outer width. The nozzle insert can include a sleeve, an endwall connected to the sleeve, an orifice, and/or a retention element. The orifice can be disposed in the endwall and/or can be fluidly connected to the tip portion of the nozzle body. The retention element can extend inward from the sleeve. A portion of the retention element can include an inner width that can be less than the outer width of the lip. The nozzle insert can be disposed onto the tip portion of the nozzle body.

The assembly of the preceding paragraph can optionally include, additionally and/or alternatively, any one or more of the following features, configurations and/or additional components.

The retention element can be positioned further away from an end of the tip portion of the nozzle body that can be opposite of the main portion than the lip of the nozzle body.

The retention element of the nozzle insert can engage with the lip of the nozzle body, wherein the lip can stop the retention element from displacement in a direction towards an end of the tip portion of the nozzle body.

The retention element comprises a first segment that can be connected to an inner sidewall of the sleeve, a second segment that can be connected to the first segment, wherein the second segment can be longer than the first segment, and a third segment that can be connected to the second segment, wherein the third segment can be shorter than the second segment.

The tip portion on the nozzle body can include a channel formed by the lip for receiving the retention element of the nozzle insert, and/or further wherein the second segment of the retention element can be positioned in the channel.

The nozzle insert further comprises a plurality of compliant features extending in an axial direction from the sleeve in a direction opposite from the endwall, wherein each of the plurality of compliant features comprises a first portion and a second portion.

The plurality of compliant features can be compressed between the collar of the nozzle body and the sleeve of the nozzle insert.

The plurality of compliant features can exert a spring force onto the collar of the nozzle body biasing the nozzle insert in a direction towards an end of the tip portion of the nozzle body.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An oil nozzle assembly comprising:
   a nozzle body comprising:
      a main portion;
      a tip portion connected to the main portion;
      a lip extending outwards from the tip portion, wherein the lip includes an outer width; and
   a nozzle insert comprising:
      a sleeve;
      an endwall connected to the sleeve;
      an orifice disposed in the endwall, wherein the orifice is fluidly connected to the tip portion of the nozzle body;
      a retention element extending inward from the sleeve, wherein a portion of the retention element includes an inner width that is less than the outer width of the lip, and further wherein the nozzle insert is disposed onto the tip portion of the nozzle body; and a plurality of compliant features extending in an axial direction from the sleeve in a direction opposite from the endwall, wherein each of the plurality of compliant features comprises a first portion and a second portion.

2. The oil nozzle assembly of claim 1 further wherein the retention element is positioned further away from an end of the tip portion of the nozzle body that is opposite of the main portion than the lip of the nozzle body.

3. The oil nozzle assembly of claim 2 further wherein the retention element of the nozzle insert engages with the lip of the nozzle body, wherein the lip stops the retention element from displacement in a direction towards the end of the tip portion of the nozzle body.

4. The oil nozzle assembly of claim 3, wherein the retention element comprises:
a first segment connected to an inner sidewall of the sleeve;
a second segment connected to the first segment, wherein the second segment is longer than the first segment; and
a third segment connected to the second segment, wherein the third segment is shorter than the second segment.

5. The oil nozzle assembly of claim 4, wherein the tip portion on the nozzle body includes a channel formed by the lip for receiving the retention element of the nozzle insert, and further wherein the second segment of the retention element is positioned in the channel.

6. The oil nozzle assembly of claim 1, wherein the plurality of compliant features is compressed between a collar of the nozzle body and the sleeve of the nozzle insert.

7. The oil nozzle assembly of claim 1, wherein the plurality of compliant features exerts a spring force onto a collar of the nozzle body biasing the nozzle insert in a direction towards an end of the tip portion of the nozzle body.

* * * * *